United States Patent [19]
Gessner et al.

[11] Patent Number: 5,503,907
[45] Date of Patent: Apr. 2, 1996

[54] BARRIER FABRICS WHICH INCORPORATE MULTICOMPONENT FIBER SUPPORT WEBS

[75] Inventors: Scott L. Gessner, Encinitas, Calif.; Jay D. Gillespie, Simpsonville, S.C.

[73] Assignee: Fiberweb North America, Inc., Simpsonville, S.C.

[21] Appl. No.: 93,796

[22] Filed: Jul. 19, 1993

[51] Int. Cl.⁶ .................................................. B32B 27/14
[52] U.S. Cl. ..................... 428/198; 428/212; 428/286; 428/903; 428/908.8
[58] Field of Search .................... 428/286, 903, 428/908.8, 198, 212

[56] References Cited

U.S. PATENT DOCUMENTS

| | | | |
|---|---|---|---|
| 4,041,203 | 8/1977 | Brock et al. | 428/157 |
| 4,196,245 | 4/1980 | Kitson et al. | 428/198 |
| 4,310,594 | 1/1982 | Yamazaki et al. | 428/296 |
| 4,373,000 | 2/1983 | Knoke et al. | 428/198 |
| 4,485,062 | 11/1984 | Dawes et al. | 264/171 |
| 4,504,539 | 3/1985 | Petracek et al. | 428/195 |
| 4,508,113 | 4/1985 | Malaney | 128/132 D |
| 4,511,615 | 4/1985 | Ohta | 428/198 |
| 4,555,811 | 12/1985 | Shimalla | 2/51 |
| 4,652,484 | 3/1987 | Shiba et al. | 428/286 |
| 4,657,804 | 4/1987 | Mays et al. | 428/212 |
| 4,863,779 | 9/1989 | Daponte | 428/152 |
| 4,891,258 | 1/1990 | Fahrenkrup | 428/138 |
| 4,902,564 | 2/1990 | Israel et al. | 428/284 |
| 5,108,827 | 4/1992 | Gessner | 428/219 |

FOREIGN PATENT DOCUMENTS

| | | |
|---|---|---|
| 405793 | 1/1991 | European Pat. Off. . |
| 416620 | 3/1991 | European Pat. Off. . |
| WO92/05949 | 4/1992 | WIPO . |

*Primary Examiner*—Christopher W. Raimund
*Attorney, Agent, or Firm*—Bell, Seltzer, Park & Gibson

[57] ABSTRACT

A composite nonwoven fabric having at least one hydrophobic microporous layer and at least one other layer formed of multicomponent fibers. The multicomponent fibers comprise a lower melting thermoplastic resin component and one or more higher melting thermoplastic resin components, wherein a substantial proportion of the surfaces of the multicomponent fibers consists of the lower melting thermoplastic resin component. The microporous layer is composed in substantial part of at least one thermoplastic resin which is thermally miscible with and adherent, upon thermal activation, to the lower melting thermoplastic resin component of the multicomponent fibers. The layers are laminated together such that the lower melting thermoplastic resin component of the layer of multicomponent fibers is thermally bonded to the thermally miscible thermoplastic resin component of the hydrophobic microporous layer to form a unitary, cohesive bond combining the layers, and wherein at least one of the higher melting thermoplastic resin components retains a fiber-like integrity in the multicomponent fibers to impart strength to the laminated nonwoven fabric.

18 Claims, 1 Drawing Sheet

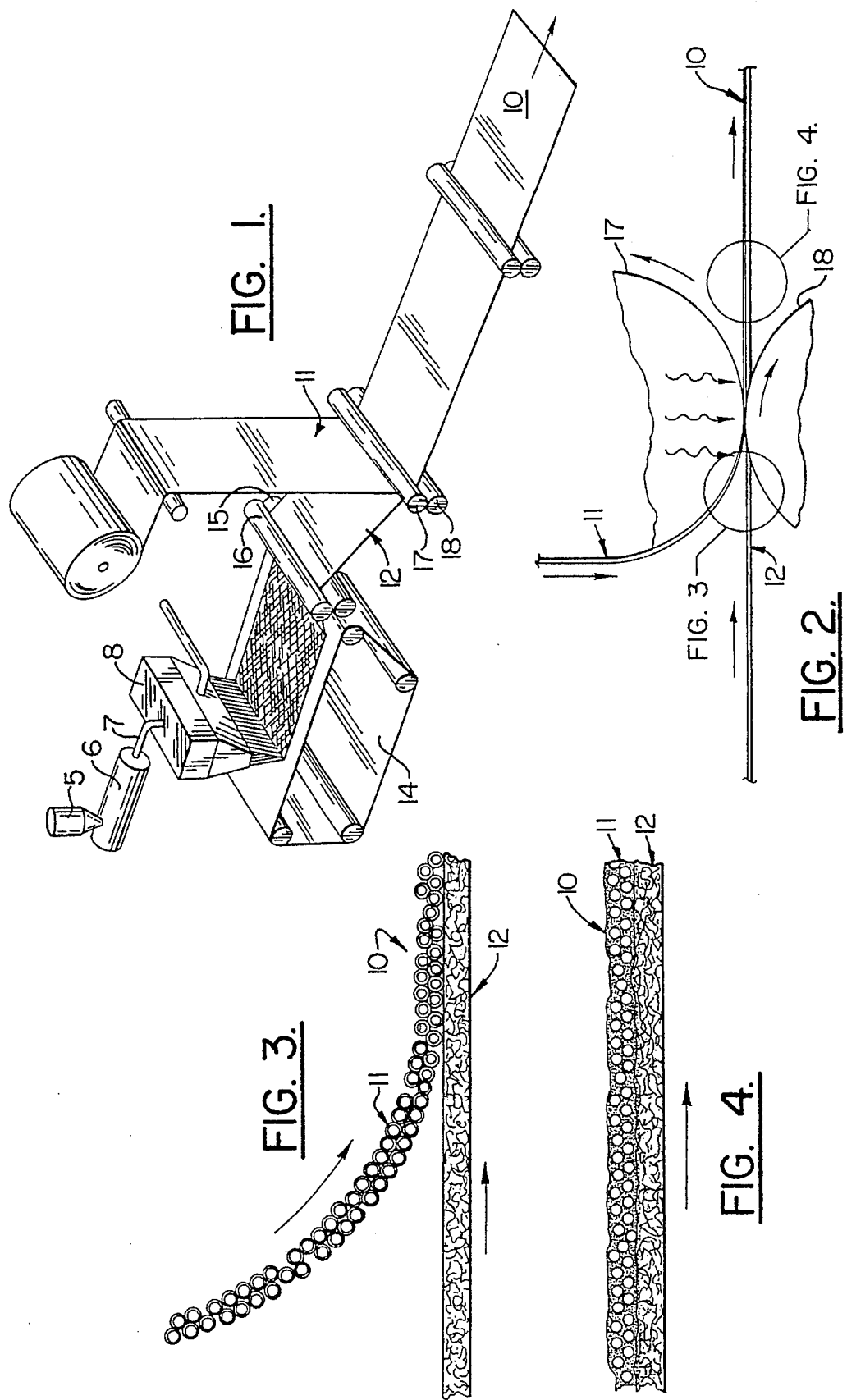

BARRIER FABRICS WHICH INCORPORATE MULTICOMPONENT FIBER SUPPORT WEBS

BACKGROUND OF THE INVENTION

This invention relates to a composite fabric, and more particularly to a nonwoven composite fabric which is gas-permeable but impervious to liquids, such as water.

Gas-permeable, water-impervious nonwoven fabrics have been developed for use in various applications. For example, nonwoven fabrics have been used commercially as a housewrap to form a barrier to air infiltration. A commercial example of such a fabric is the product Tyvek® sold by Dupont.

Gas-permeable, water-impervious nonwoven fabrics are also used in various medical applications as a barrier to the passage of fluids or microorganisms. Such fabrics are used as hospital gowns, surgical drapes, CSR wraps, and the like. Nonwoven fabrics of this type are described, for example, in the following U.S. Pat. Nos.: 4,041,203; 4,196,245; 4,310,594; 4,504,539; 4,508,113; 4,555,811; 4,657,804; 4,766,029; and 4,863,785.

Typically, the nonwoven barrier fabrics of this general type are of a composite or laminated construction and employ one or more microporous layers to provide the barrier properties to the fabric and one or more layers of reinforcing fibers or filaments to lend strength to the fabric. For example, the microporous layer may be a meltblown web of microfibers produced, for example, as described in Buntin et al., U.S. Pat. No. 3,849,241. The layer of reinforcing filaments may be a spunbonded nonwoven fabric.

In the manufacture of this type of fabric, the respective nonwoven layers are typically bonded together thermally to form a unitary composite fabric. For example, the thermal bonding may be carried out by passing the nonwoven layers through a heated patterned calender and partially melting one or more of the fibrous components. Without sufficient melting, the fabric laminate will have poor inter-ply adhesion. However, unless the thermal bonding conditions are accurately controlled, the possibility exists that the thermal bond areas may be heated excessively, which can destroy or compromise the barrier properties of the meltblown barrier layer.

Also, many of the prior fabrics experience a loss in tear and tensile properties when the layers are laminated by thermal calendering. Temperatures required to bond the layers together may cause some relaxation of the fiber orientation of the reinforcing fibers or filaments.

Also, the resulting composite fabric may have very low elongation. As a result, when the fabric is subjected to load, it tends to yield catastrophically by tearing rather than by stretching. Greater stretch would result in a tougher structure with higher tear properties and less prone to punctures and rips.

SUMMARY OF THE INVENTION

The present invention overcomes many of the shortcomings and limitations of prior nonwoven barrier fabrics and provides a product with excellent tensile and tear properties, good abrasion resistance, and which is permeable to gas but impervious to water.

The composite nonwoven fabrics of the present invention have at least one hydrophobic microporous layer and at least one other layer formed of multicomponent fibers. The multicomponent fibers comprise a lower melting thermoplastic resin component and one or more higher melting thermoplastic resin components, wherein a substantial proportion of the surfaces of the multicomponent fibers consists of the lower melting thermoplastic resin component.

The microporous layer is composed in substantial part of at least one thermoplastic resin which is thermally miscible with and adherent, upon thermal activation, to the lower melting thermoplastic resin component of the multicomponent fibers.

The layers are laminated together such that the lower melting thermoplastic resin component of the layer of multicomponent fibers is thermally bonded to the thermally miscible thermoplastic resin component of the hydrophobic microporous layer to form a unitary, cohesive bond combining the layers, and wherein at least one of the higher melting thermoplastic resin components retains a fiber-like integrity in the multicomponent fibers to impart strength to the laminated nonwoven fabric. By appropriate pairing of the composition of the microporous layer and the composition of the lower melting component of the multicomponent fibers to assure thermal miscibility, the present invention achieves a unitary and cohesive bond between the polymer components during thermal bonding as distinguished from thermal bonds resulting primarily from mechanical forces (encapsulation) which may occur when the polymer components are not thermally miscible. The unitary cohesive bonds achieved by the present invention provide for improved tear strength and toughness in the resulting composite products.

The layer of multicomponent fibers can be a spunbonded web of multicomponent filaments, a carded web of multicomponent staple fibers, or an air-laid or wet-laid web of multicomponent staple fibers. The microporous layer preferably comprises a nonwoven web of meltblown microfibers.

In accordance with one particular embodiment of the present invention, there is provided an abrasion resistant gas-permeable water-impervious composite nonwoven fabric which comprises at least one carded web of multicomponent staple length fibers. The multicomponent fibers comprise a low melting thermoplastic resin component and one or more higher melting thermoplastic resin components, wherein a substantial proportion of the surfaces of said multicomponent fibers consists of said lower melting thermoplastic resin component. The fabric also includes at least one hydrophobic microporous web formed from meltblown microfine fibers having a fiber diameter of up to 50 microns and composed in substantial part of fibers of at least one thermoplastic resin which is thermally miscible with and adherent, upon thermal activation, to the lower melting thermoplastic resin component of the layer of multicomponent fibers. The lower melting thermoplastic resin component of the carded web of multicomponent fibers is thermally bonded to the thermally miscible thermoplastic resin component of the hydrophobic web of meltblown microfine fibers to form a unitary cohesive bond combining the layers, and wherein at least one of the higher melting thermoplastic resin components retains a fiber-like integrity in said multicomponent fibers to impart strength to the nonwoven fabric.

The present invention also provides a method of forming an abrasion resistant gas-permeable water-impervious composite nonwoven fabric. The method includes the steps of forming at least one layer of multicomponent fibers, said multicomponent fibers comprising a lower melting thermoplastic resin component and one or more higher melting thermoplastic resin components, wherein a substantial proportion of the surfaces of the multicomponent fibers consists of said lower melting thermoplastic resin component. The method further comprises positioning this layer of multicomponent fibers in opposing face-to-face relation with at least one hydrophobic microporous layer composed in substantial part of at least one thermoplastic resin which is thermally miscible with and adherent, upon thermal activation, to said lower melting thermoplastic resin component of said layer of multicomponent fibers. The method further comprises thermally bonding the layer of multicomponent fibers to the hydrophobic microporous layer at a temperature below the melt temperature of at least one of said higher melting thermoplastic resin components and under such conditions that the lower melting thermoplastic resin component of the multicomponent fibers and the thermally miscible thermoplastic resin component of the hydrophobic microporous layer form unitary, cohesive bonds, while the higher melting thermoplastic resin component retains a fiber-like integrity in the multicomponent fibers to impart strength to the composite nonwoven fabric.

The fabrics in accordance with this invention may be used in a wide range of end uses depending upon the choice of fibers, ply properties and lamination conditions. Examples include filtration products, housewrap, protective garments, surgical gowns and drapes, CSR wrap, etc.

BRIEF DESCRIPTION OF THE DRAWINGS

Further features and advantages of the invention will become apparent from the detailed description which follows, from the accompanying drawing, in which:

FIG. 1 is a perspective view showing a process and apparatus for producing a composite nonwoven fabric in accordance with one embodiment of the invention.

FIG. 2 is a enlarged detailed cross sectional view of the apparatus taken along the line 2—2 in FIG. 1.

FIG. 3 is a greatly enlarged schematic cross sectional view showing the layers of the composite nonwoven fabric prior to lamination.

FIG. 4 is a greatly enlarged schematic cross sectional view showing the composite fabric after lamination.

DESCRIPTION OF PREFERRED EMBODIMENTS

One embodiment of the nonwoven composite fabric of the present invention is illustrated in the drawings and indicated generally by the reference character 10. The nonwoven fabric 10 is of a two-sided construction including a first ply 11 of multicomponent fibers which substantially define one face of the fabric and a second ply 12 of microfine fibers which substantially define the opposite face of the fabric.

The first ply 11 may comprise one or more layers of multicomponent fibers or filaments which can be formed into one or more nonwoven webs by conventional nonwoven processing techniques such as carding, garnetting, spunbonding, wet-laying or air-laying. The fibers or filament of the ply may be prebonded by thermal bonding or by resin or adhesive binders. Ply 11 may suitably have a basis weight of at least about 3 g/m² up to about 100 g/m², and preferably from about 10 g/m² to about 30 g/m².

In the embodiment illustrated, ply 11 comprises of multicomponent staple length fibers which have been formed into a nonwoven web by a conventional textile carding machine and prebonded by thermal calendering with a patterned calender.

The multicomponent fibers of ply 11 have a lower melting thermoplastic resin component and one or more higher melting thermoplastic components, with a substantial proportion of the surfaces of the fibers consisting of the lower melting thermoplastic resin component. The fibers may, for example, comprise structured bicomponent fibers of the conventional sheath-core or side-by-side configuration.

For purposes of this invention, it is important that a significant proportion of the fiber surface be formed by the lower melting polymer component, so that the lower melting component will be available for bonding, as explained more fully below. At least one of the higher melting components should be present in the multicomponent fiber in a substantially continuous form. Preferably the lower melting polymer component should have a melting temperature at least 5° C. below that of the higher melting component, so that at the temperatures employed for thermal bonding of the plies of the composite fabric 10, the higher melting component retains its substantially continuous fibrous form to provide a strengthening and reinforcing function in the composite fabric.

The particular polymer compositions used in the higher and lower melting components of the multicomponent fibers may be selected from any of those polymers conventionally used in forming melt-spun fibers, depending upon the properties desired in the composite nonwoven fabric and the specific end use applications intended for the fabric. Examples of suitable polymers for the lower melting component include polyolefins such as polyethylene, polyethylene copolymers and terpolymers, polypropylene, polypropylene copolymers and terpolymers, polybutene, poly(4-methyl, 1-pentene) or TPX and blends thereof; poly(vinyl alcohol); poly(methyl methacrylate; EVA; EMA; EAA; thermoplastic elastomers; polyamides such as nylon 6; polyamide copolymers and miscible blends of polyamide and other polymers; polyesters; polyester copolymers and miscible blends of polyester and other polymers; and polyacrylates. Examples of suitable polymers for the higher melting component include higher melting polyolefins such as TPX or certain polypropylenes (e.g. higher melting isotactic and syndiotactic polypropylene); higher melting polyamides such as nylon 66; polyesters; polyacrylates; polystyrene; polycarbonate; polyphenylene sulfide (PPS); polyphenylene oxide (PPO) and miscible blends of the above.

The second ply 12 comprises at least one hydrophobic microporous layer. The microporous layer may comprise a microporous film, a microporous sheet or web formed of thermally consolidated microfibers, or a microporous nonwoven web of microfibers. The microfibers preferably have a diameter of up to 50 microns, and most desirably the fiber diameter is less than 10 microns. The microfibers may comprise air-laid or wet-laid synthetic pulp or may be formed of meltblown microfibers, or blends of meltblown microfibers with other fibers.

The polymer used for forming the microfibers should be selected so that it is thermally miscible with the lower melting thermoplastic resin component of the multicomponent fibers By "thermally miscible" we mean that the polymers, when heated to thermal bonding temperatures, will be cohesive and will join together to form a single, unitary bond domain. Typically, to be "thermally miscible", the polymers will be of the same chemical composition or of such a similar chemical composition that the polymers are miscible with one another. If of different chemical compositions, the surface energies of the polymers are sufficiently similar such that they readily form a cohesive bond when heated to thermal activation temperature. Examples of thermally miscible polymers include polybutene with polypropylene, ethylene/propylene copolymer with polypropylene, PVA with PET, polyethylene copolymers ($C_3$–$C_{12}$) with high density polyethylene. In contrast, polymers which are not thermally miscible with one another (such as polyethylene and polypropylene for example) do not have such an affinity to one another to form cohesive bonds. Under thermal bonding conditions, the polymers may bond together, but the bond mechanism is predominately, if not exclusively, a mechanical bond resulting from mechanical interlocking or encapsulation. The polymers do not form a unitary polymer domain but remain as separate identifiable polymer phases.

Another way of expressing the thermal miscibility of two polymers is the difference in the polymer solubility parameters ($\delta$). Desirably the lower melting component of the multicomponent fiber and the polymer of the microfibrous layer have a difference in solubility parameters ($\delta$) of less than 4.0 $(J/cm^3)^{1/2}$ for polymers above a $MW_n$ of 20,000, and preferably less than about 1. Most preferably, the difference in solubility parameters ($\delta$) is less than 0.4 $(J/cm^3)^{1/2}$.

Tables of solubility parameter values for many solvents and some polymers, as well as methods for estimating solubility parameter values for polymers and copolymers, can be found in "Polymer Handbook," 2nd Edition, J. Brandrup and E. H. Immergut, Editors, Wiley-Interscience, New York, 1975, p. IV-337ff, which is incorporated by reference herein. See also Fred Billmeyer, Jr. "Textbook of Polymer Science", 3rd Ed.; K. L. Hoy, "New Values of the Solubility Parameters from Vapor Pressure Data, "J. Paint Technology, 42, p 76– 118 (1970). The use of solubility parameters in determining the compatibility of polymer mixtures has been described, for example, by C. B. Bucknall in "Toughened Plastics", chapter 2, Applied Science Publishers Ltd., London, 1977.

One embodiment of a suitable method and apparatus for making the nonwoven fabric of this invention is illustrated in FIG. 1, which is a simplified, diagrammatic illustration of apparatus capable of carrying out the method of forming a nonwoven fabric in accordance with this invention. A meltblown web 12 is produced on a conventional melt blowing apparatus. As shown, thermoplastic polymer pellets are placed in the feed hopper 5 of a screw extruder 6, where they are heated to a temperature sufficient to melt the polymer. The molten polymer is forced by the screw through conduit 7 into a spinning block 8 and the polymer is extruded from the spin block 8 through a plurality of small diameter capillaries, into a high velocity gas stream, such as compressed air.

The technique of melt-blowing is known in the art and is discussed in various patents, e.g., Buntin et al., U.S. Pat. No. 3,978,185; Buntin, U.S. Pat. No. 3,972,759; and McAmish et al., U.S. Pat. No. 4,622,259, the disclosures of which are hereby incorporated by reference.

The meltblown microfibers are deposited onto a foraminous endless belt 14 and form a coherent web which is removed from the belt by a pair of consolidation rolls 15 and 16. The rolls 15 and 16 optionally may include bonding elements (not shown) in the form of a relief pattern to provide a desired extent of point bonding of the microfibrous web. At these points where heat and pressure is applied, the fibers fuse together, resulting in strengthening of the web structure.

The microfibrous web from consolidation rolls 15 and 16 is fed to rolls 17 and 18 where it is combined with a preformed web 11 comprising multicomponent staple fibers drawn from a supply roll. In the particular embodiment shown, the preformed web 11 is a prebonded carded web formed from bicomponent staple length textile fibers. Alternatively, the web may be a spunbonded web of continuous multicomponent filaments, or a wet-laid or air-laid web of multicomponent staple fibers. While a preformed web is shown, it will be appreciated that the web could be formed in a continuous in-line process and combined with the meltblown web. It will also be understood that additional webs could be combined with the meltblown web, on one or both sides thereof.

Another embodiment of the nonwoven composite fabric of the invention has one layer of the multicomponent fibers forming one exposed face of the laminated nonwoven fabric and another layer of the multicomponent fibers forming the opposite exposed face of the fabric, with the hydrophobic microporous layer being located between the layers of multicomponent fibers. In still another embodiment, a layer of the multicomponent fibers forms one exposed face of the laminated nonwoven fabric and the hydrophobic microporous layer is located adjacent to said layer of multicomponent fibers and interiorly of the fabric. An additional nonwoven layer of hydrophilic fibers forms the opposite exposed face of the laminated nonwoven fabric, and is secured directly or indirectly to the hydrophobic microporous layer.

The invention will be further understood from the illustrative examples which follow.

EXAMPLE 1

Three denier (3.3 dtex) per filament sheath/core polyethylene/polyester (PE/PET) bicomponent fibers of one and one-half inch (3.8 cm) staple length were formed into a one ounce per square yard (33.9 g/m²) carded web on a conventional carding machine. The carded web was passed through the nip of an oil-heated calender stack comprised of an embossed roll (18% land area) and a smooth steel roll and the carded web was thermally bonded. Next a 20 gram per square yard (24 g/m²) polyethylene meltblown web having individual filament diameters below 10 microns was laminated to the carded web by calendering the two plies between the heated nip of a smooth steel roll and a hard rubber roll. The resulting laminate exhibited excellent strength and tear properties and marginal liquid barrier properties. The fabric had good breathability, limited liquid permeability, and good stability to ultraviolet light. It had a hand and drape comparable to the commercially available Tyvek housewrap.

EXAMPLE 2

A carded web bicomponent staple fibers was produced as in Example 1, except using 1.7 denier (1.9 dtex) per filament polyethylene/polyethylene terephthalate fibers. This web was combined with a 30 gram per square meter meltblown web of linear low density polyethylene.

The physical properties of the web was compared to two commercially available housewrap products, a 0.75 ounce per square yard (25.4 g/m²) spunbonded polypropylene/20 gram per square meter polypropylene meltblown laminate sold under the mark Barricade by James River Corporation, and Tyvek sold by Dupont. The high TEA and elmendorf tear properties of the invention compare favorably to the commercially available products and are indicative of the toughness of the products. The comparative properties are set forth in Table 1 below.

TABLE 1

| Sample | basis wt. (gsy) | MD (g) | % E | TEA | CD (g) | % E (CD) | TEA | ELMENDORF TEAR MD | ELMENDORF TEAR CD | GURLEY POROSITY (sec) | WATER VAPOR TRANS. (g/hr – m²) |
|---|---|---|---|---|---|---|---|---|---|---|---|
| The inv. (Ex 2) | 59.7 | 3003 | 64 | 798 | 963 | 106 | 632 | 358 | 509 | 59.3 | 24.1 |
| Barricade | 45.3 | 3535 | 25 | 597 | 1490 | 26 | 259 | 70 | 362 | 6.8 | 21.4 |
| Tyvek | 37 | 4966 | 13 | 447 | 4964 | 14 | 561 | 80 | 358 | 28.6 | 16.4 |

EXAMPLE 3

A carded nonwoven web was produced as in Example 1 but using Dupont's D-271 and D-269 polyester bicomponent, which has a PET core and a co-polyester sheath. The sheath melt temperature was 110° C. for the B-271 bicomponent and 130° C. for the B-269 bicomponent. The carded bicomponent fiber web was laminated to a polybutylene terephthalate (PBT) meltblown web using a 16% helical calender bond pattern and using a "flat" calender. All samples formed a strong fabric that resists delamination but retains all of the initial filtration properties of the meltblown web. The flat calendered samples were breathable, and a texture and hand similar to paper. The helical-bonded fabrics were strong and had pleasing hand and drape properties. The samples and lamination conditions are set forth in Table 2.

web of meltblown polypropylene microfibers (20 grams per square meter) and with a 12 gram per square yard polypropylene spunbond web (Celestra®, a trademark of Fiberweb North America). The three layers were calendered at a calender pressure of 300 pli, at a calender surface temperature of 300° F./290° F. (smooth roll/embossed roll), and line speed of 120 fpm.

Sample B: A bicomponent/meltblown/bicomponent laminate was produced by combining 20.5 gsy basis weight carded web of the bicomponent fibers, a 20 gsm polypropylene meltblown nonwoven web and a 28.5 gsy basis weight carded web of the bicomponent fibers. The same calender conditions as for Sample A were used.

The physical properties of the resulting nonwoven fabric laminates are set forth in Table 3.

TABLE 2

| Databook No. | Description | Helical Embossed Steel Roll (F) | Helical Embossed Steel Roll (F) | Smooth Steel Roll (F) | Rubber Roll (F) | Pressure (psi) | Speed (fpm) |
|---|---|---|---|---|---|---|---|
| 8334-02 | 2-ply,D-271+PBT MB | — | — | 270 | 270 | 350 | 10.5 |
| 8334-03 | 2-ply,D-269+PBT MB | — | — | 270 | 270 | 350 | 10.5 |
| 8334-04 | 2-ply,D271+PBT MB | 271 | 282 | — | — | 350 | 7.5 |
| 8334-05 | 2-ply,D269+PBT MB | 277 | 282 | — | — | 350 | 7.5 |
| 8334-06 | 3-ply,D269/PBT MB/D-269 | 280 | 281 | — | — | 350 | 7.5 |
| 8334-07 | 3-ply,D269/PBT MB/D-271 | 281 | 282 | — | — | 350 | 7.5 |

EXAMPLE 4

A carded nonwoven fabric produced as in Example 1 is laminated to a web of wet-laid synthetic pulp formed of poly(4-methyl 1-pentane) (TPX).

TABLE 3

| | Basis weight (gsy) | MD Tensile | % Elong. (MD) | TEA (MD) | CD Tensile | % Elong (CD) | TEA (CD) | Elm. Tear MD (g) | Elm. Tear CD (g) | Gurley Porosity (sec) | Mullen Burst (psi) |
|---|---|---|---|---|---|---|---|---|---|---|---|
| A | 60.2 | 5994 | 22 | 1025 | 1949 | 27 | 321 | 315 | 518 | 7.87 | 43 |
| B | 59.1 | 6824 | 17 | 866 | 2193 | 29 | 478 | 223 | 410 | 9.28 | 44 |

EXAMPLE 5

Carded nonwoven webs were produced as in Example 1, but using 1.7 denier per filament polypropylene/PET sheath/core bicomponent fibers (BASF Merge 1181).

Sample A: A spunbond/meltblown/bicomponent laminate was produced by combining a carded bicomponent fiber web of 28.5 gram per square yard basis weight with a nonwoven That which is claimed is:

1. An abrasion-resistant gas-permeable water-impervious laminated nonwoven fabric comprising:
   at least one layer of sheath-core bicomponent fibers, said bicomponent fibers comprising a lower melting thermoplastic resin sheath component and a higher melting thermoplastic resin core component, and at least one hydrophobic layer of microfine fibers having a fiber diameter of up to 50 microns composed in substantial part of fibers of at least one thermoplastic resin which is thermally miscible with and adherent upon thermal activation to said lower melting thermoplastic resin component of said layer of bicomponent fibers and has a difference in solubility parameters (δ) with respect to the lower melting component of said bicomponent fibers of less than 1.0 $(J/cm^3)^{1/2}$, wherein said thermoplastic resin of said microfine fibers of said hydrophobic layer and said lower melting thermoplastic resin component of said bicomponent fibers comprise polymers derived from different monomers, said lower melting thermoplastic resin component of said layer of bicomponent fibers being thermally bonded to said hydrophobic layer of microfine fibers to form a unitary, cohesive bond combining the layers, and wherein at least said higher melting thermoplastic resin component retains a fiber-like integrity in said bicomponent fibers to impart strength to the laminated nonwoven fabric.

2. An abrasion-resistant gas-permeable water-impervious laminated nonwoven fabric comprising:

at least one layer of sheath-core bicomponent fibers, said bicomponent fibers comprising a lower melting thermoplastic resin sheath component and a higher melting thermoplastic resin core component, and at least one hydrophobic layer of microfine fibers having a fiber diameter of up to 50 microns composed in substantial part of fibers of at least one thermoplastic resin which is thermally miscible with and adherent upon thermal activation to said lower melting thermoplastic resin component of said layer of bicomponent fibers and has a difference in solubility parameters (δ) with respect to the lower melting component of said bicomponent fibers of less than 1.0 $(J/cm^3)^{1/2}$, wherein said thermoplastic resin of said microfine fibers of said hydrophobic layer and said lower melting thermoplastic resin component of said bicomponent fibers comprise polymers derived from different monomers, or wherein said thermoplastic resin of said microfine fibers of said hydrophobic layer and said lower melting thermoplastic resin component of said bicomponent fibers comprise co- or terpolymers derived from the same monomer and incorporating either different comonomers or different amounts of the same comonomer, said lower melting thermoplastic resin component of said layer of bicomponent fibers being thermally bonded to said hydrophobic layer of microfine fibers to form a unitary, cohesive bond combining the layers, and wherein at least said higher melting thermoplastic resin component retains a fiber-like integrity in said bicomponent fibers to impart strength to the laminated nonwoven fabric.

3. An abrasion-resistant gas-permeable water-impervious laminated nonwoven fabric comprising:

at least one layer of sheath-core bicomponent fibers, said bicomponent fibers comprising a lower melting thermoplastic resin sheath component and a higher melting thermoplastic resin core component, and at least one hydrophobic layer of microfine fibers having a fiber diameter of up to 50 microns composed in substantial part of fibers of at least one thermoplastic resin which is thermally miscible with and adherent upon thermal activation to said lower melting thermoplastic resin component of said layer of bicomponent fibers, and has a difference in solubility parameters (δ) with respect to the lower melting sheath component of said bicomponent fibers of less than 1.0 $(J/cm^3)^{1/2}$, wherein one of said lower melting thermoplastic resin component of said bicomponent fibers and the other of said thermoplastic resin of said microfine fibers is selected from the group consisting of polybutene and polypropylene resins; ethylene/propylene copolymer and polypropylene resins; and linear low density polyethylene and high density polyethylene resins, and said lower melting thermoplastic resin component of said layer of bicomponent fibers being thermally bonded to said hydrophobic layer of microfine fibers to form a unitary, cohesive bond combining the layers, and wherein at least said higher melting thermoplastic resin component retains a fiber-like integrity in said bicomponent fibers to impart strength to the laminated nonwoven fabric.

4. A method of forming an abrasion-resistant gas-permeable water-impervious laminated nonwoven fabric comprising:

forming at least one layer of multicomponent fibers, said multicomponent fibers comprising a lower melting thermoplastic resin component and one or more higher melting thermoplastic resin components, wherein a substantial proportion of the surfaces of said multicomponent fibers consists of said lower melting thermoplastic resin component, positioning said at least one layer of multicomponent fibers in opposing face-to-face relation with at least one hydrophobic microporous layer composed in substantial part of at least one thermoplastic resin which is thermally miscible with and adherent, upon thermal activation, to said lower melting thermoplastic resin component of said layer of multicomponent fibers, and has a difference in solubility parameters (δ) with respect to the lower melting sheath component of said multi-component fibers of less than 1.0 $(J/cm^3)^{1/2}$, wherein one of said lower melting thermoplastic resin component of said multicomponent fibers and the other of said thermoplastic resin of said microporous layer is selected from the group consisting of polybutene and polypropylene resins; ethylene/propylene copolymer and polypropylene resins; and linear low density polyethylene and high density polyethylene resins, and thermally bonding said at least one layer of multicomponent fibers to said at least one hydrophobic microporous layer at a temperature below the melt temperature of at least one of said higher melting thermoplastic resin components and under such conditions that the lower melting thermoplastic resin component of said layer of multicomponent fibers and said thermally miscible thermoplastic resin component of said hydrophobic microporous layer form unitary, cohesive bonds while said higher melting thermoplastic resin component retains a fiber-like integrity in said multicomponent fibers to impart strength to the laminated nonwoven fabric.

5. A method according to claim 4, wherein said step of positioning said at least one layer of multicomponent fibers in opposing face-to-face relation with at least one hydrophobic microporous layer comprises positioning said at least one layer of multicomponent fibers in opposing face-to-face relation with a nonwoven web of meltblown microfibers.

6. A nonwoven fabric according to claim 3, wherein said at least one layer of multicomponent fibers comprises at least one nonwoven web selected from the group consisting of spunbonded, carded, air-laid, or wet-laid webs.

7. A nonwoven fabric according to claim 3, wherein said at least one hydrophobic microporous layer comprises a nonwoven web of meltblown microfibers.

8. A nonwoven fabric according to claim 3, wherein said unitary, cohesive bonds comprise discrete point bonds at spaced-apart locations throughout the fabric.

9. A nonwoven fabric according to claim 3, wherein said layer of multicomponent fibers forms one exposed face of the laminated nonwoven fabric and said hydrophobic microporous layer forms the opposite face of the nonwoven fabric.

10. A nonwoven fabric according to claim 3, wherein one layer of multicomponent fibers forms one exposed face of the laminated nonwoven fabric and another layer of multicomponent fibers forms the opposite exposed face of the laminated nonwoven fabric, and wherein said hydrophobic microporous layer is located between said layers of multicomponent fibers.

11. A nonwoven fabric according to claim 10, wherein said unitary, cohesive bonds comprise discrete point bonds at spaced-apart locations throughout the fabric combining the layers to form a composite fabric.

12. A nonwoven fabric according to claim 3, wherein said at least one layer of multicomponent fibers forms one exposed face of the laminated nonwoven fabric and wherein said hydrophobic microporous layer is located adjacent to said layer of multicomponent fibers and interiorly of the fabric, and including a nonwoven layer of hydrophilic fibers forming the opposite exposed face of the laminated nonwoven fabric.

13. A nonwoven fabric according to claim 3, wherein said multicomponent fibers have a lower melting thermoplastic resin component of polybutene and wherein said hydrophobic microporous layer comprises a nonwoven web of meltblown polypropylene microfibers.

14. A nonwoven fabric according to claim 3, wherein said multicomponent fibers have a lower melting thermoplastic resin component of an ethylene/propylene copolymer and wherein said hydrophobic microporous layer comprises a nonwoven web of meltblown polypropylene microfibers.

15. A nonwoven fabric according to claim 3, wherein said multicomponent fibers have a lower melting thermoplastic resin component of linear low density polyethylene and wherein said hydrophobic microporous layer comprises a nonwoven web of meltblown high density polyethylene microfibers.

16. A nonwoven fabric according to claim 3, wherein the difference in solubility parameters ($\delta$) of said thermoplastic resin of said microfine fibers with respect to the lower melting sheath component of said bicomponent fibers is less than 0.4 $(J/cm^3)^{1/2}$.

17. An abrasion-resistant gas-permeable water-impervious laminated nonwoven fabric comprising at least one layer of sheath-core bicomponent fibers, said bicomponent fibers comprising a lower melting polyolefin resin sheath component and a higher melting thermoplastic resin core component, and at least one hydrophobic layer of microfine fibers having a fiber diameter of up to 50 microns composed in substantial part of fibers of at least one polyolefin resin which is thermally miscible with and adherent, upon thermal activation, to said lower melting polyolefin resin component of said layer of multicomponent fibers, and has a difference in solubility parameters ($\delta$) with respect to the lower melting sheath component of said bicomponent fibers of less than 0.4 $(J/cm^3)^{1/2}$, wherein one of said lower melting polyolefin resin component of said multicomponent fibers and the other of said polyolefin resin of said microfine fibers is selected from polybutene and polypropylene resins; ethylene/propylene copolymer and polypropylene resins; and linear low density polyethylene and high density polyethylene resins, said lower melting polyolefin resin component of said layer of bicomponent fibers being thermally bonded to said hydrophobic layer of microfine fibers to form a unitary, cohesive bond combining the layers, and wherein at least said higher melting thermoplastic resin component retains a fiber-like integrity in said bicomponent fibers to impart strength to the laminated nonwoven fabric.

18. A method according to claim 4 wherein said step of forming at least one layer of multicomponent fibers comprises forming the lower melting thermoplastic resin component thereof from a thermoplastic resin having a difference in solubility parameters ($\delta$) with respect to the thermoplastic resin component of said hydrophobic ply of microfine fibers of less than 0.4 $(J/cm^3)^{1/2}$.

* * * * *